(12) United States Patent
Lee et al.

(10) Patent No.: US 8,576,212 B2
(45) Date of Patent: Nov. 5, 2013

(54) BILLBOARD DISPLAY SYSTEM AND METHOD

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 456 days.

(21) Appl. No.: 12/908,010

(22) Filed: Oct. 20, 2010

(65) Prior Publication Data

US 2012/0001879 A1 Jan. 5, 2012

(30) Foreign Application Priority Data

Jun. 30, 2010 (TW) .............................. 99121360 A (51) Int. Cl.
*G06F 3/038* (2013.01)
*G09G 5/00* (2006.01)

(52) U.S. Cl.
USPC ........................................... 345/207; 348/42

(58) Field of Classification Search
USPC .................................. 345/55, 204
See application file for complete search history.

(56) References Cited

U.S. PATENT DOCUMENTS

| | | | |
|---|---|---|---|
| 2003/0169906 A1* | 9/2003 | Gokturk et al. | 382/115 |
| 2004/0119602 A1* | 6/2004 | Blum et al. | 340/815.4 |
| 2004/0208394 A1 | 10/2004 | Kurato | |
| 2005/0035962 A1* | 2/2005 | Ishibashi et al. | 345/419 |
| 2006/0044149 A1* | 3/2006 | Blum et al. | 340/687 |
| 2009/0158309 A1* | 6/2009 | Moon et al. | 725/12 |
| 2009/0177528 A1* | 7/2009 | Wu et al. | 705/10 |
| 2010/0027832 A1* | 2/2010 | Koseki | 381/387 |

FOREIGN PATENT DOCUMENTS

CN 101499253 A 8/2009

* cited by examiner

*Primary Examiner* — Viet Pham
(74) *Attorney, Agent, or Firm* — Altis & Wispro Law Group, Inc.

(57) ABSTRACT

A billboard display method includes: capturing images of a scene near the screen by a number of cameras, detecting the images from the cameras to determine whether there is a person nearby the screen, detecting the images to determine a relative position of the person to the screen upon the condition that there is a person nearby the screen, and controlling a media to be shown at a corresponding position of the screen according to the relative position of the person to the screen.

12 Claims, 10 Drawing Sheets

BILLBOARD DISPLAY SYSTEM AND METHOD

CROSS-REFERENCE TO RELATED APPLICATIONS

Relevant subject matter is disclosed in two co-pending U.S. patent applications (application Ser. Nos. 12/910,812 and 12/914,923) having the same title, which are assigned to the same assignee as this patent application.

BACKGROUND

1. Technical Field

The present disclosure relates to a billboard display system and a billboard display method.

2. Description of Related Art

Most conventional columnar electronic billboards cannot change the position of the advertisement being displayed according to the location of an individual, this restricts the coverage of the advertisement. Therefore there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
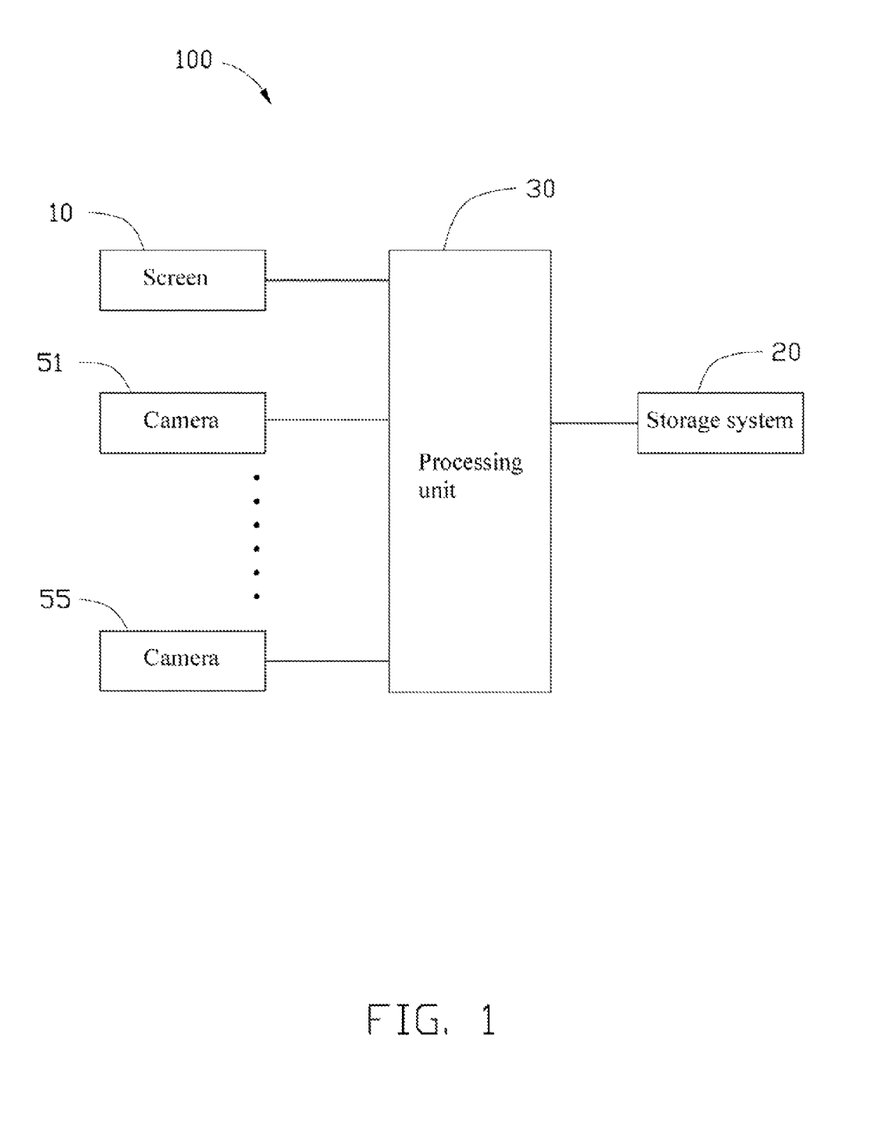
FIG. 1 is a block diagram of an exemplary embodiment of a billboard display system, the billboard display system includes a storage system and five cameras.
Figure 2:
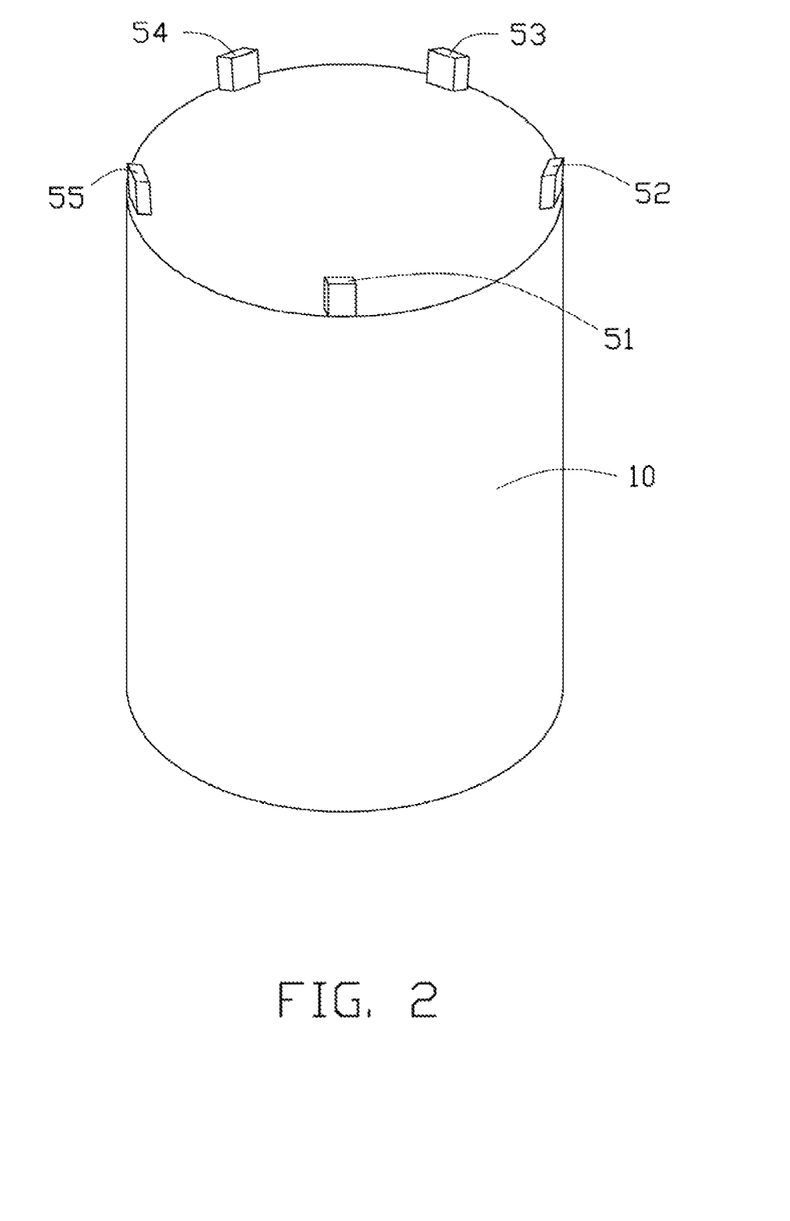
FIG. 2 is a schematic diagram of the billboard display system of FIG. 1.

Referring to FIGS. 1 and 2, an exemplary embodiment of a billboard display system 100 includes a screen 10, a storage system 20, a processing unit 30, and five cameras 51-55. In other embodiments, the billboard display system 100 may include more or less than five cameras.

The screen 10 is a columnar electronic billboard. The cameras 51-55 are equidistantly mounted on a top edge of the screen 10 to form a circle. Each of the cameras 51-55 captures images of an area near the screen 10 so a 360 degrees view can be captured and examined, and transmits the images to the processing unit 30.

Figure 3:
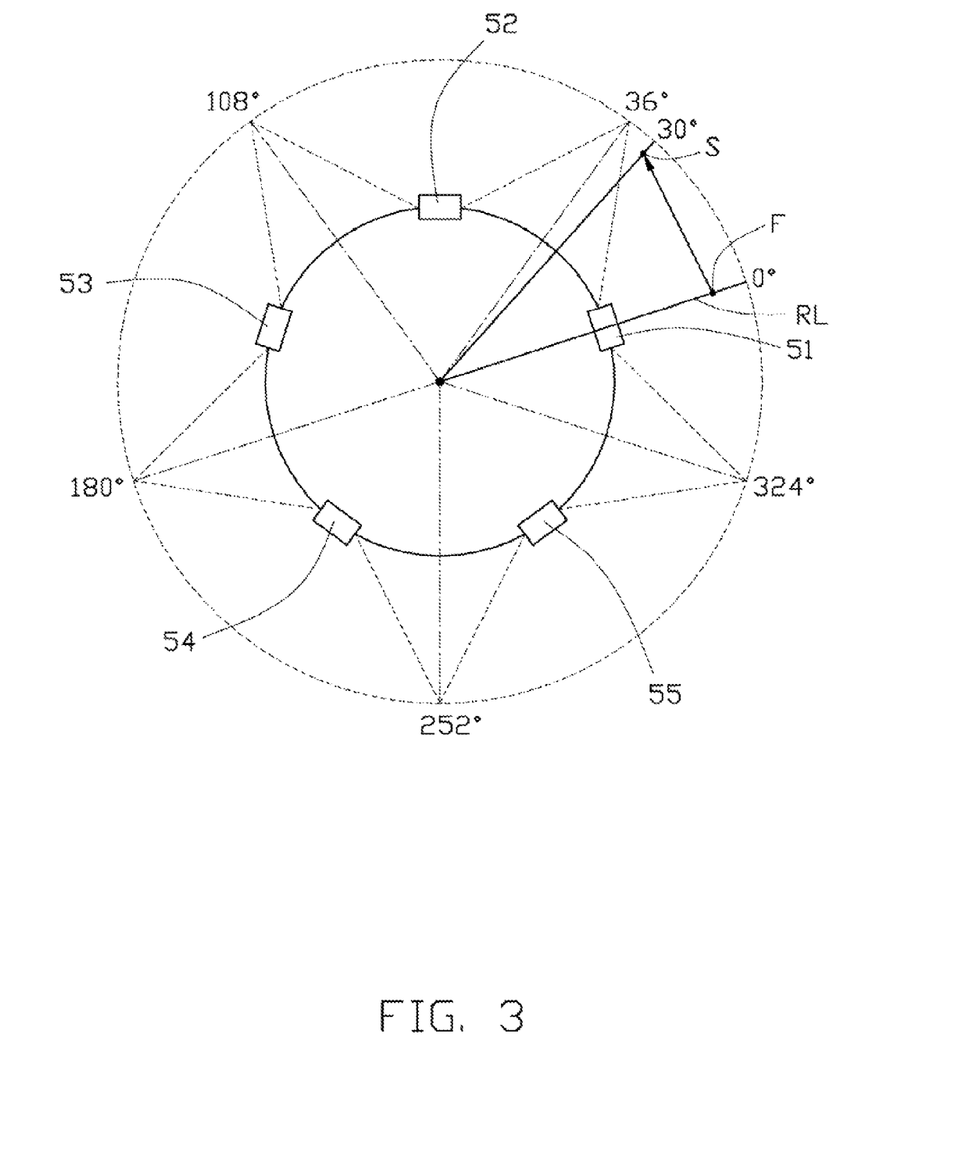
FIG. 3 is a schematic diagram of the billboard display system of FIG. 1 in a working state.

Referring to FIG. 3, in the embodiment, each of the cameras 51-55 captures an image of a fifth area near the screen 10 so that up to a 72 degrees view can be captured by one camera. In other words, the top edge of the screen 10 is divided into five parts. Each of the cameras 51-55 is mounted on a center of one part of the top edge of the screen 10 (see FIG. 2).

Figure 4:
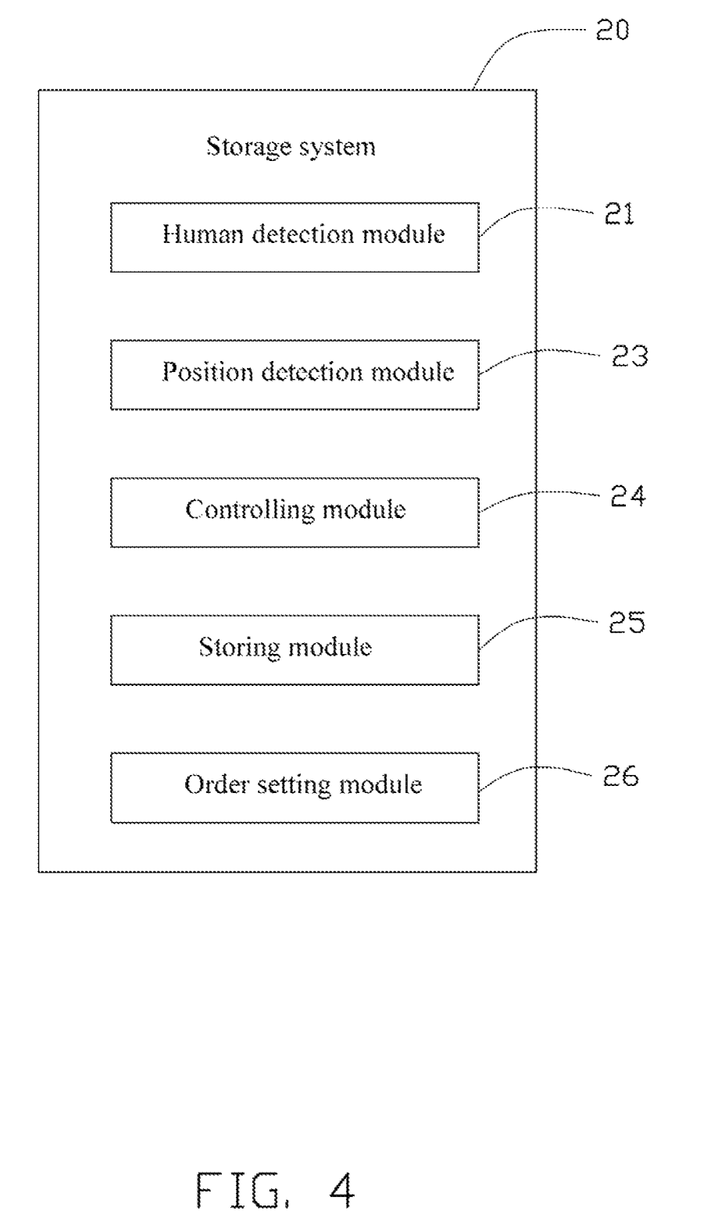
FIG. 4 is a block diagram of the storage system of FIG. 2.

Referring to FIG. 4, the storage system 20 includes a human detection module 21, a position detection module 23, a controlling module 24, a storing module 25, and an order setting module 26 which may include one or more computerized instructions and are executed by the processing unit 30 (see FIG. 1).

The storing module 25 stores an advertisement image. In the embodiment, the image is a clock.

The human detection module 21 checks images captured by the cameras 51-55 to determine whether there is a person nearby the screen 10. The human detection module 150 may use any known human recognition technology when analyzing the images.

The position detection module 23 checks the images including the image determined to contain a person to determine a relative position of the person to the screen 10. In the embodiment, it may be understood that the relative position of the person to the screen 10 can be regarded as the angle between a line from a center of the person to a center of the screen 10 and a reference line. In the embodiment, the reference line is a line from the center of the screen 10 through a center of the camera 51 marked "RL" in FIG. 3. We can consider the RL to be a 0 degrees line extending from the screen 10. And so it follows that we can consider there are many lines extending from the screen, one for each of 360 degrees and that a person in view of any of the cameras will occupy a position on one of those lines.

Figure 5:
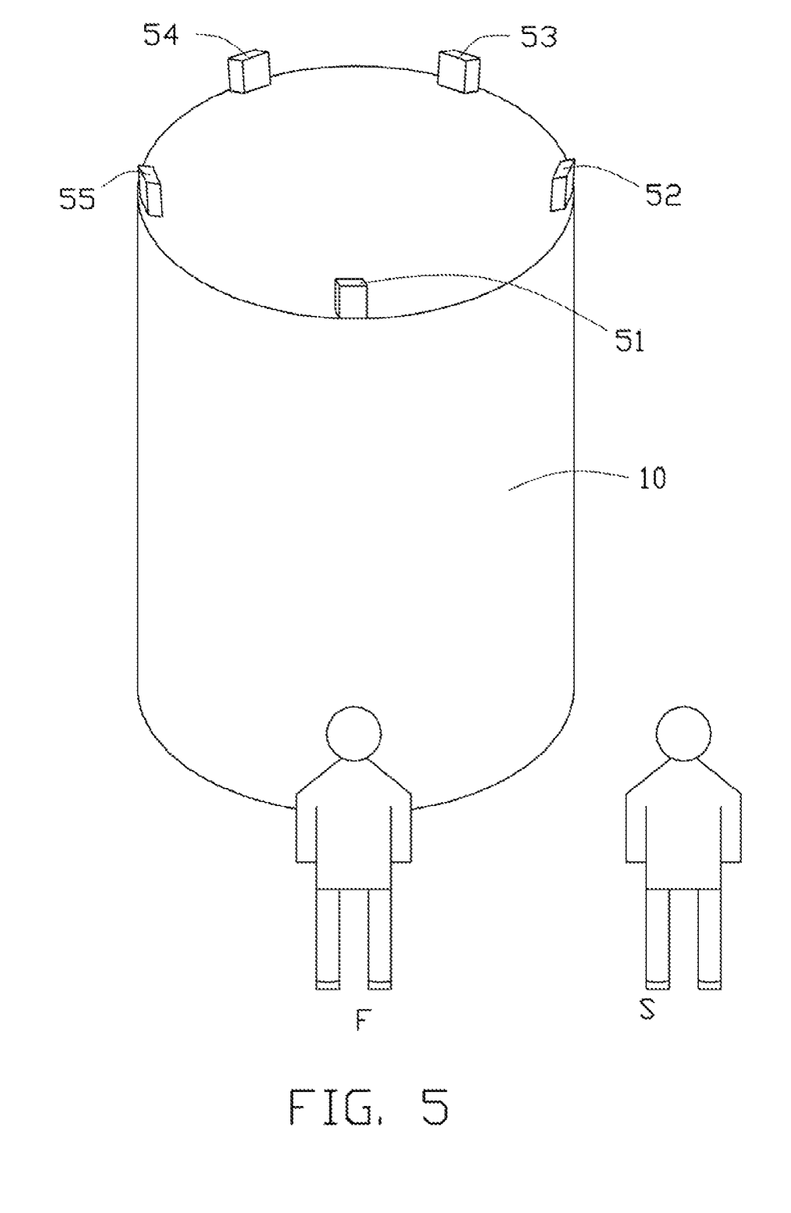
FIG. 5 is another schematic diagram of the billboard display system of FIG. 1 in a working state.

Referring to FIG. 5, in the embodiment, when a person is located at a position F in view of the camera 51 as shown in FIGS. 3 and 5, a line from the center of the person to the center of the screen 10 is coincident with the reference line, namely the angle between the line from the center of the person to the center of the screen 10 and the reference line is 0 degrees. Therefore the relative position of the person to the screen 10 is 0 degrees. As a result, when the image captured by the camera 51 contains the person image, the relative position of the person to the screen 10 is within a range from 324 degrees to 36 degrees in an anti-clockwise direction going through 0 degrees (see FIG. 3). When the image captured by the camera 52 contains the person image, the relative position of the person to the screen 10 is within a range from 36 degrees to 108 degrees in an anti-clockwise direction. When the image captured by the camera 53 contains the person image, the relative position of the person to the screen 10 is within a range from 108 degrees to 180 degrees in an anti-clockwise direction. When the image captured by the camera 54 contains the person image, the relative position of the person to the screen 10 is within a range from 180 degrees to 252 degrees in an anti-clockwise direction. When the image captured by the camera 55 contains the person image, the relative position of the person to the screen 10 is within a range from 252 degrees to 324 degrees in an anti-clockwise direction.

Figure 6:
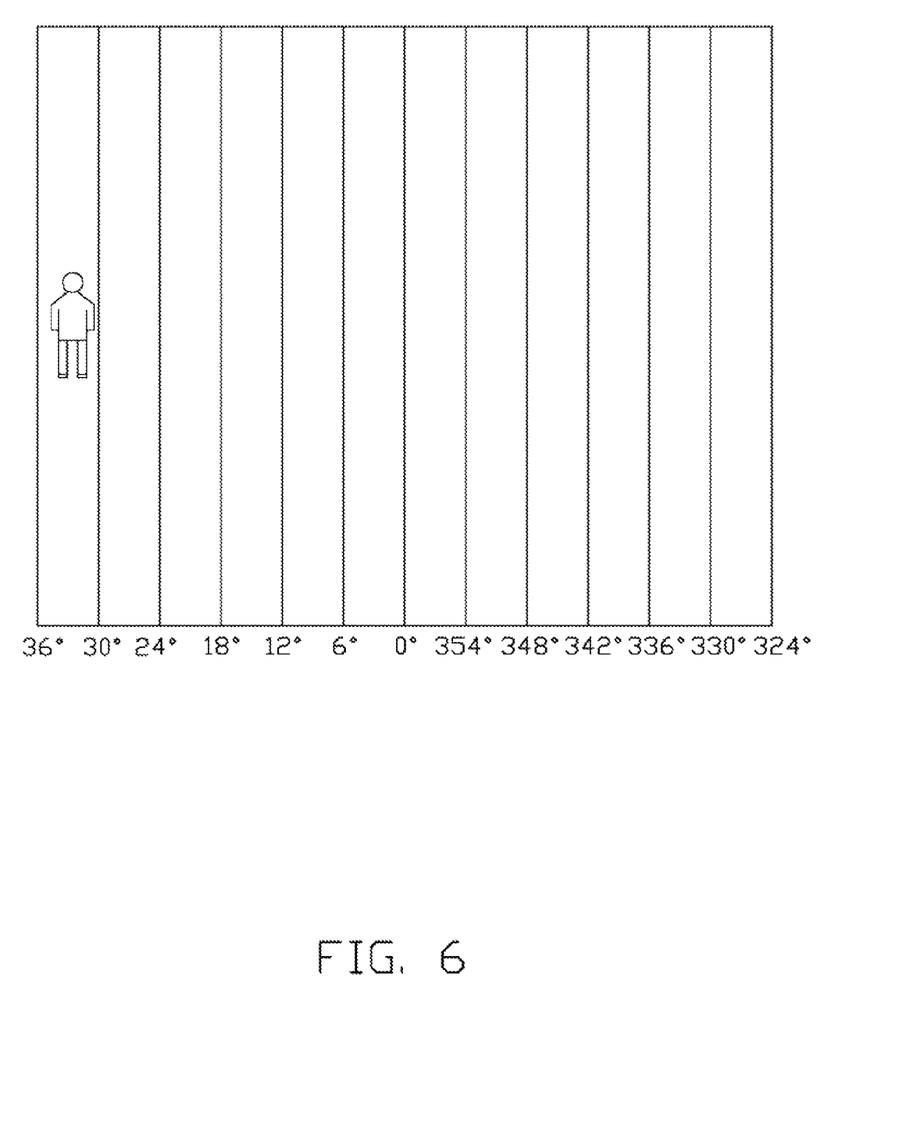
FIG. 6 is a schematic diagram of an image captured by one of the cameras of FIG. 1.

Referring to FIG. 6, the image captured by the camera 51 is divided into twelve parts. Each part indicates a possible relative position of the person to the screen 10. For example, when the person stands at a position S as shown in FIGS. 3 and 5, the person image captured by the camera 51 is in the first part on the left. As a result, the relative position of the person and the screen 10 is within a range of 30 degrees to 36 degrees.

Figure 7:
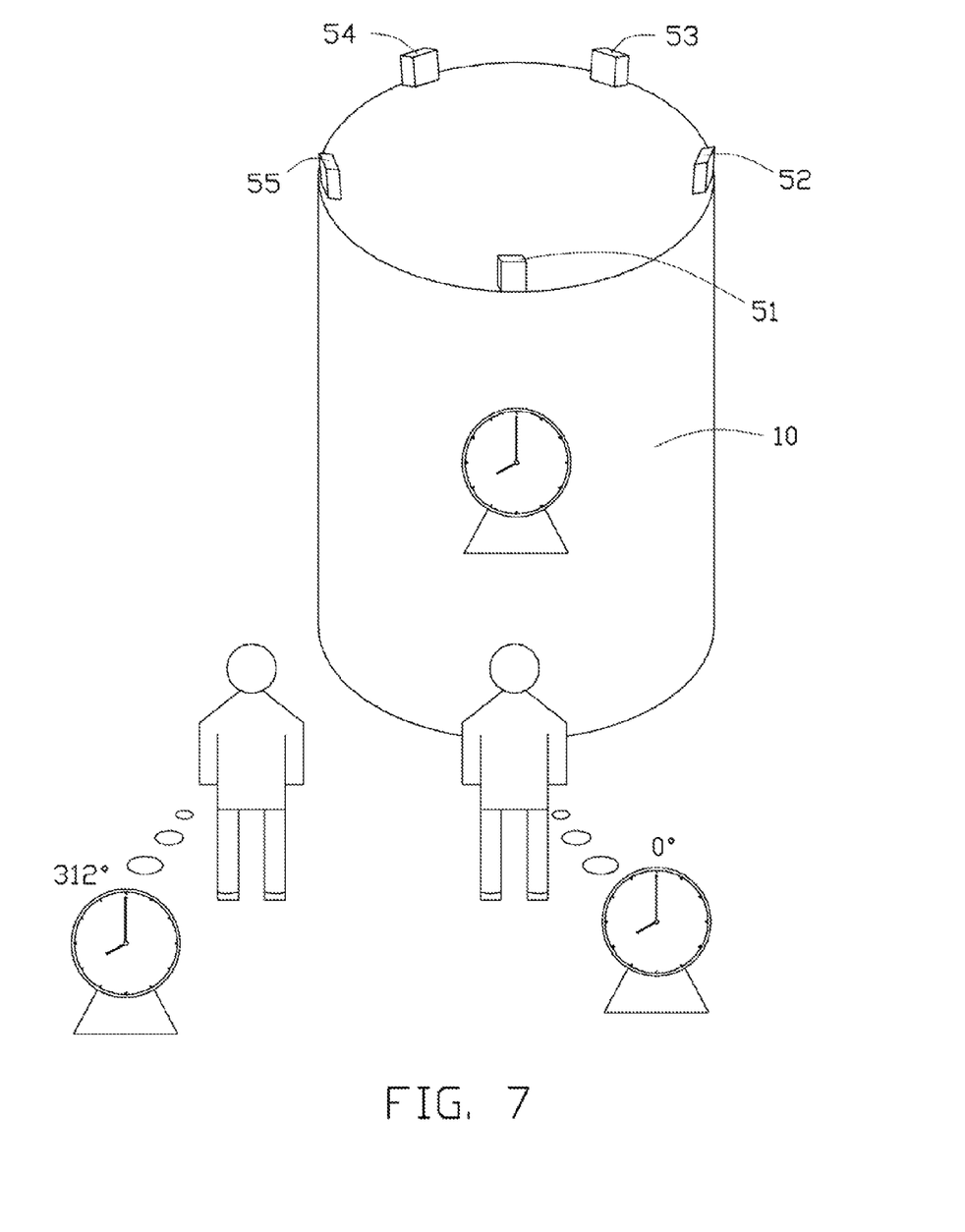
FIG. 7 is a schematic diagram of the billboard display system displaying an image according to a position of an individual.

Referring to FIG. 7, the controlling module 24 controls the image stored in the storing module 25 to be shown at a corresponding position of the screen 10 according to the relative position of the person to the screen 10. As a result, the person can watch the image on the screen 10 from wherever the person stands at near the screen 10.

Figure 8:
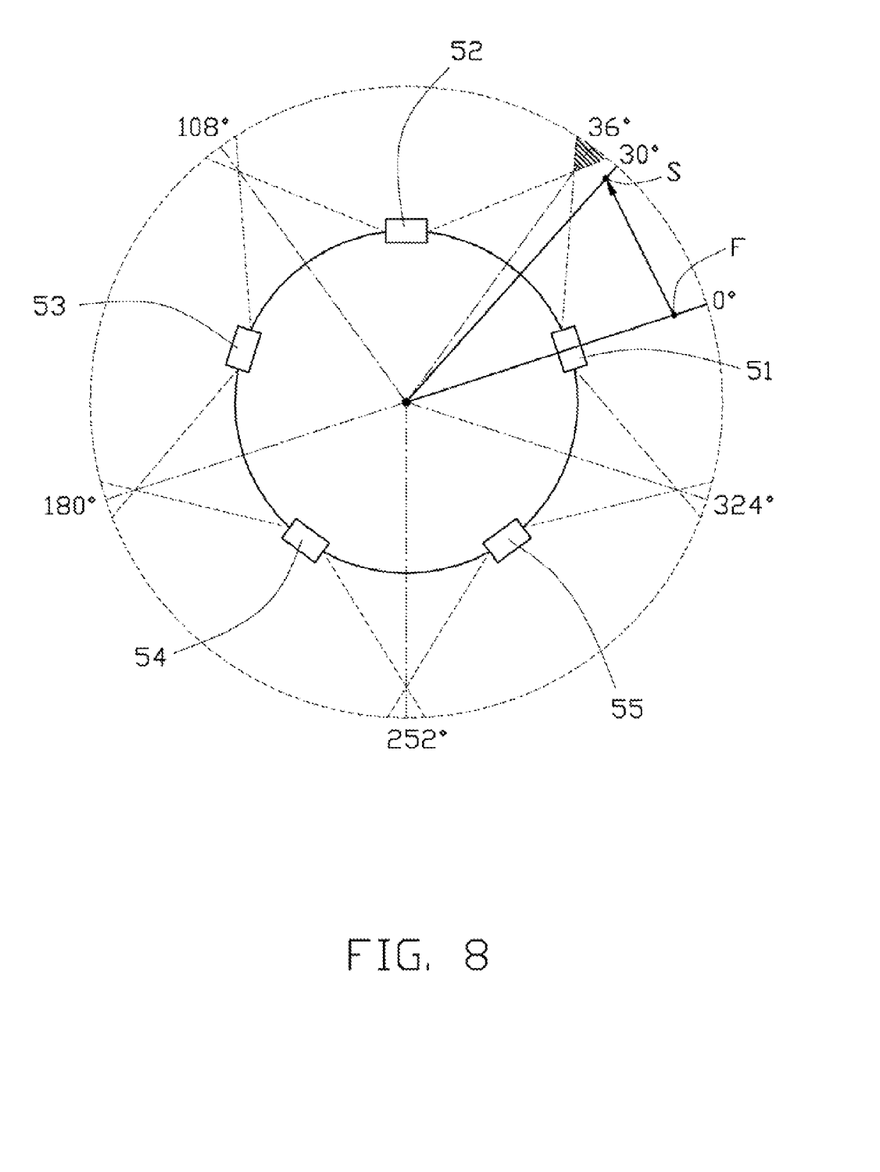
FIG. 8 is a schematic diagram of another embodiment of a billboard display system in a working state.

Referring to FIG. 8, in other embodiments, if two adjacent cameras, such as the cameras 51 and 52, can capture the images of the person, the person image is in both of the images captured by the cameras 51 and 52. For example, when the person stands in the shaded region shown in FIG. 8, the cameras 51 and 52 can capture the person. At this time, the relative position of the person to the screen 10 can be within a range from 324 degrees to 36 degrees in an anti-clockwise direction or within a range from 36 degrees to 108 degrees in an anti-clockwise direction. At this condition, operators can set the rules to make the position detection module 23 determine that the relative position of the person to the screen 10 is within a range from 324 degrees to 36 degrees in an anti-clockwise direction or within a range from 36 degrees to 108 degrees in an anti-clockwise direction. If the position detection module 23 determines that the relative position of the person to the screen 10 is within a range from 324 degrees to 36 degrees in an anti-clockwise direction, the position detection module 23 further determines the relative position of the person to the screen 10 according to the image captured by the camera 51.

The order setting module 26 sets an order that the position detection module 23 detects the relative positions of two or more persons to the screen 10 when there are two or more persons nearby the screen 10.

Figure 9:
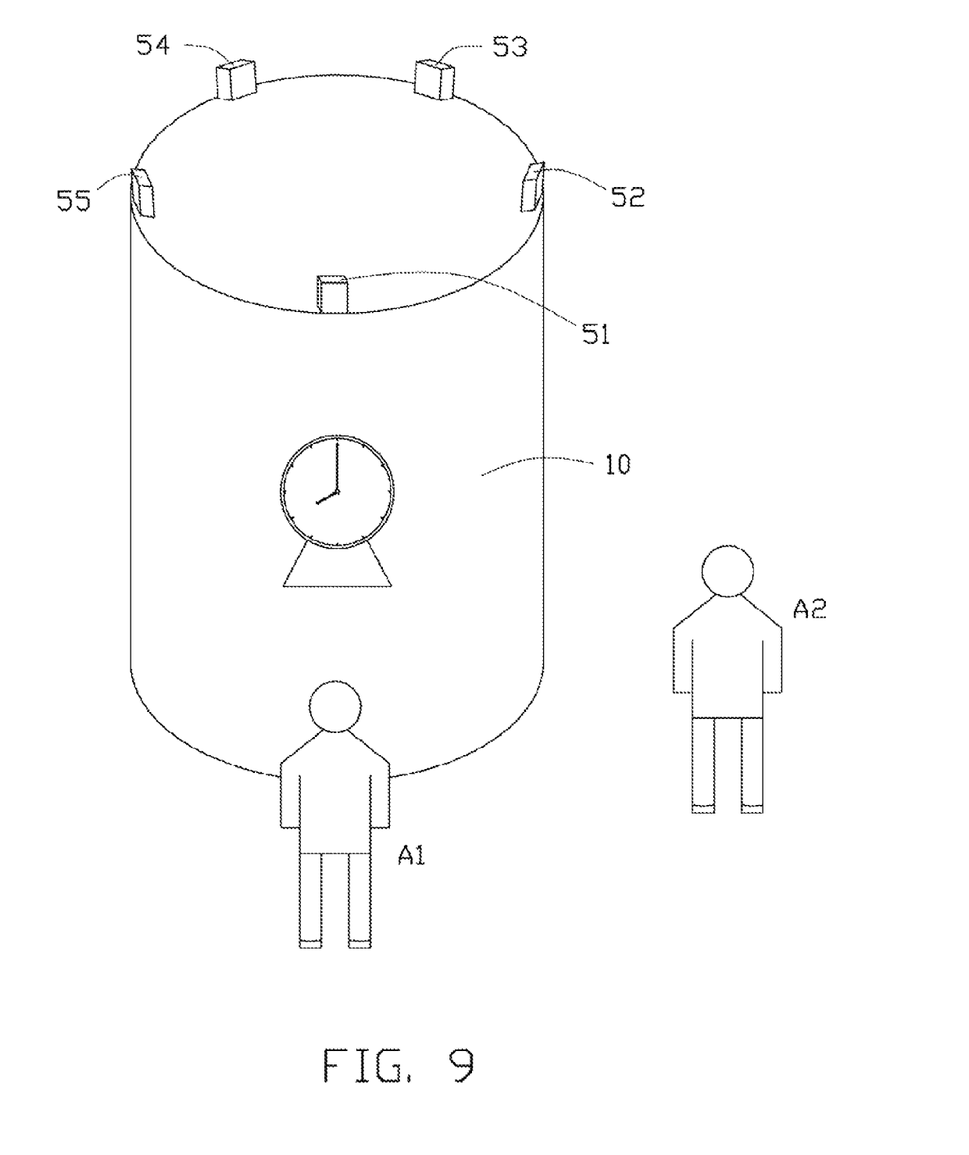
FIG. 9 is a schematic diagram of the billboard display system of FIG. 1 when there are two individuals.

Referring to FIG. 9, when two persons A1 and A2 stand nearby the screen 10, the order setting module 26 sets the order that the position detection module 23 detects the relative positions of the two persons A1 and A2 to the screen 10 according to the time the person being nearby the screen 10. For example, when a first person A1 stands nearby the screen 10 early, the position detection module 23 detects the relative position of the first person A1 to the screen 10. After a period of time, a second person A2 stands nearby the screen 10, the order setting module 26 controls the position detection module 23 not to detect the relative position of the second person A2 to the screen 10. Until the first person A1 leaves, namely the first person image is not in the images captured by the cameras 51-55, the order setting module 26 controls the position detection module 23 to detect the relative position of the second person A2 to the screen 10.

When the two persons A1 and A2 are standing nearby the screen 10 at the same time, the order setting module 26 can set the order according to a serial number of each camera. For example, the camera 51 captures the image of the first person A1, and the camera 52 captures the image of the second person A2. The order setting module 26 controls the position detection module 23 detects the relative position of the first person A1 to the screen 10. Until the first person A1 leaves, namely the first person image is not in the images captured by the cameras 51-55, the order setting module 26 controls the position detection module 23 to detect the relative position of the second person A2 to the screen 10.

Figure 10:
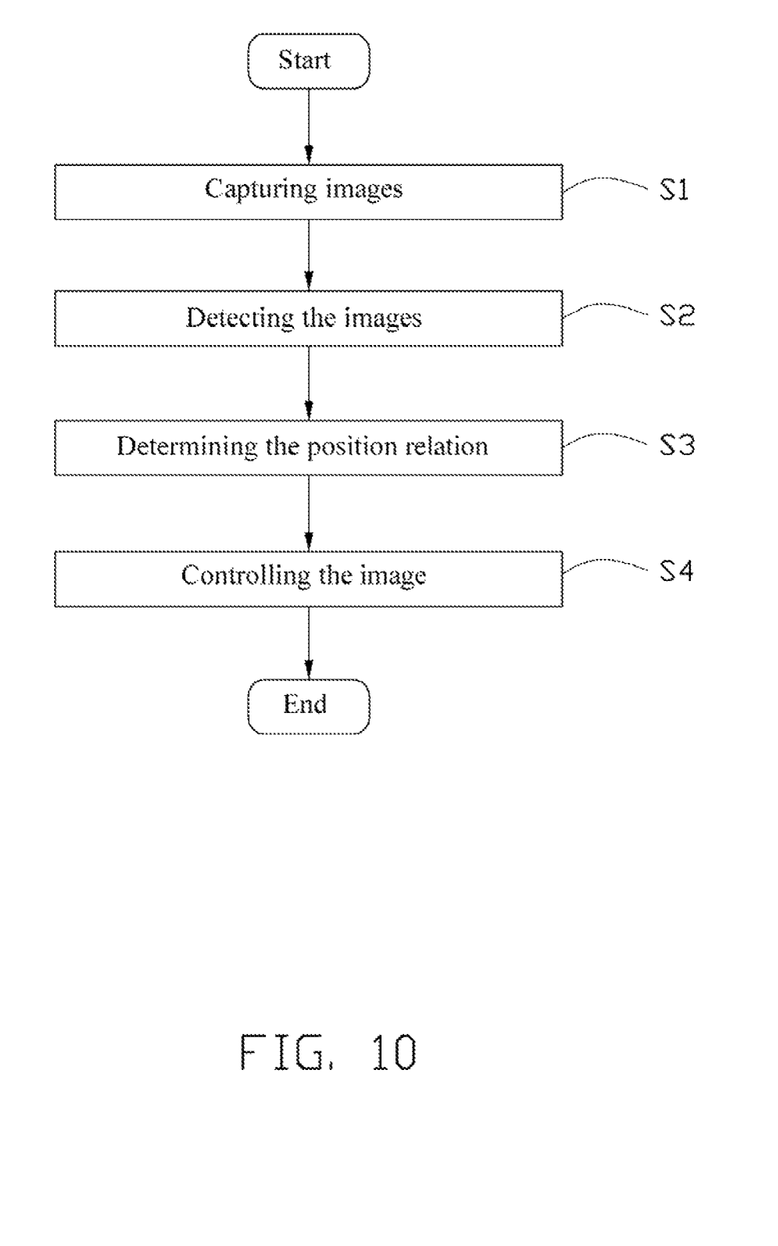
FIG. 10 is a flowchart of an exemplary embodiment of a billboard display method.

Referring to FIG. 10, an exemplary embodiment of a billboard display method includes the following steps.

In step S1, the cameras 51-55 capture images of a scene near the screen 10.

In step S2, the human detection module 21 detects the images from the cameras 51-55 to determines whether there is a person nearby the screen 10. If a person image is in one of the images captured by the cameras 51-55, the process flows to step S3. If no person image is in each of the images captured by the cameras 51-55, the process returns to step S1.

In step S3, the position detection module 23 detects the images including the person image to determine the relative position of the person and the screen 10.

In step S4, the controlling module 24 controls the image stored in the storing module 25 to be shown at a corresponding position of the screen 10 according to the relative position of the person to the screen 10.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A billboard display system comprising:
    a screen;
    a plurality of cameras to captured images of a scene near the screen, wherein the scene is divided into a plurality of parts, each of the plurality of cameras captures images in at least one of the parts, one of the plurality of cameras is assigned with a reference line;
    a processing unit connected between the cameras and the screen; and
    a storage system connected to the processing unit and storing a plurality of programs to be executed by the processing unit, wherein the storage system comprises:
    a human detection module to check the images captured by the plurality of cameras to determine whether there is a person nearby the screen;
    a position detection module to check the images to determine a relative position of the person according to an angle between a line from a center of the person to a center of the screen and the reference line when there is a person nearby the screen; and
    a controlling module to control a media to be shown at a corresponding position of the screen according to the relative position of the person to the screen.

2. The billboard display system of claim 1, wherein the screen is a columnar electronic billboard.

3. The billboard display system of claim 2, wherein the plurality of cameras are equidistantly mounted on a top edge of the screen, the position detection module further checks whether the person is captured by at least two of the plurality of cameras, the position detection module determines the relative position according to one of the at least two of the plurality of cameras.

4. The billboard display system of claim 1, wherein the storage system further comprises an order setting module, the order setting module sets an order that the position detection module detects the relative positions of two or more persons to the screen when there are two or more persons nearby of the screen.

5. The billboard display system of claim 4, wherein the position detection module sets the order that the position detection module detects the relative position of two or more persons to the screen according to the time the persons being nearby the screen.

6. The billboard display system of claim 4, wherein the position detection module sets the order that the position detection module detects the relative position of two or more persons to the screen according to a serial number of each camera.

7. A billboard display method comprising:
- capturing images of a scene near a screen by a plurality of cameras, wherein the scene is divided into a plurality of parts, each of the plurality of cameras captures images in at least one of the parts, one of the plurality of cameras is assigned with a reference line;
- detecting the images from the plurality of cameras to determine whether there is a person nearby the screen;
- detecting the images to determine a relative position of the person according to an angle between a line from a center of the person to a center of the screen and the reference line upon the condition that there is a person nearby the screen; and
- controlling a media to be shown at a corresponding position of the screen according to the relative position of the person to the screen.

8. The billboard display method of claim 7, wherein the screen is a columnar electronic billboard.

9. The billboard display method of claim 8, wherein the plurality of cameras are equidistantly mounted on a top edge of the screen.

10. The billboard display method of claim 7, further comprising:
- setting an order that detects the relative positions of two or more persons to the screen when there are two or more persons nearby the screen according to the time the persons being nearby the screen.

11. The billboard display method of claim 7, further comprising:
- setting an order that detects the relative positions of two or more persons to the screen when there are two or more persons nearby the screen according to a serial number of each camera.

12. The billboard display method of claim 7, further comprising:
- checking whether the person is captured by at least two of the plurality of cameras; and
- determining the relative position according to one of the at least two of the plurality of cameras in response to the person being captured by at least two of the plurality of cameras.

* * * * *